Aug. 28, 1945. R. M. DILWORTH 2,383,850
FLEXIBLE COUPLING
Filed Nov. 10, 1942
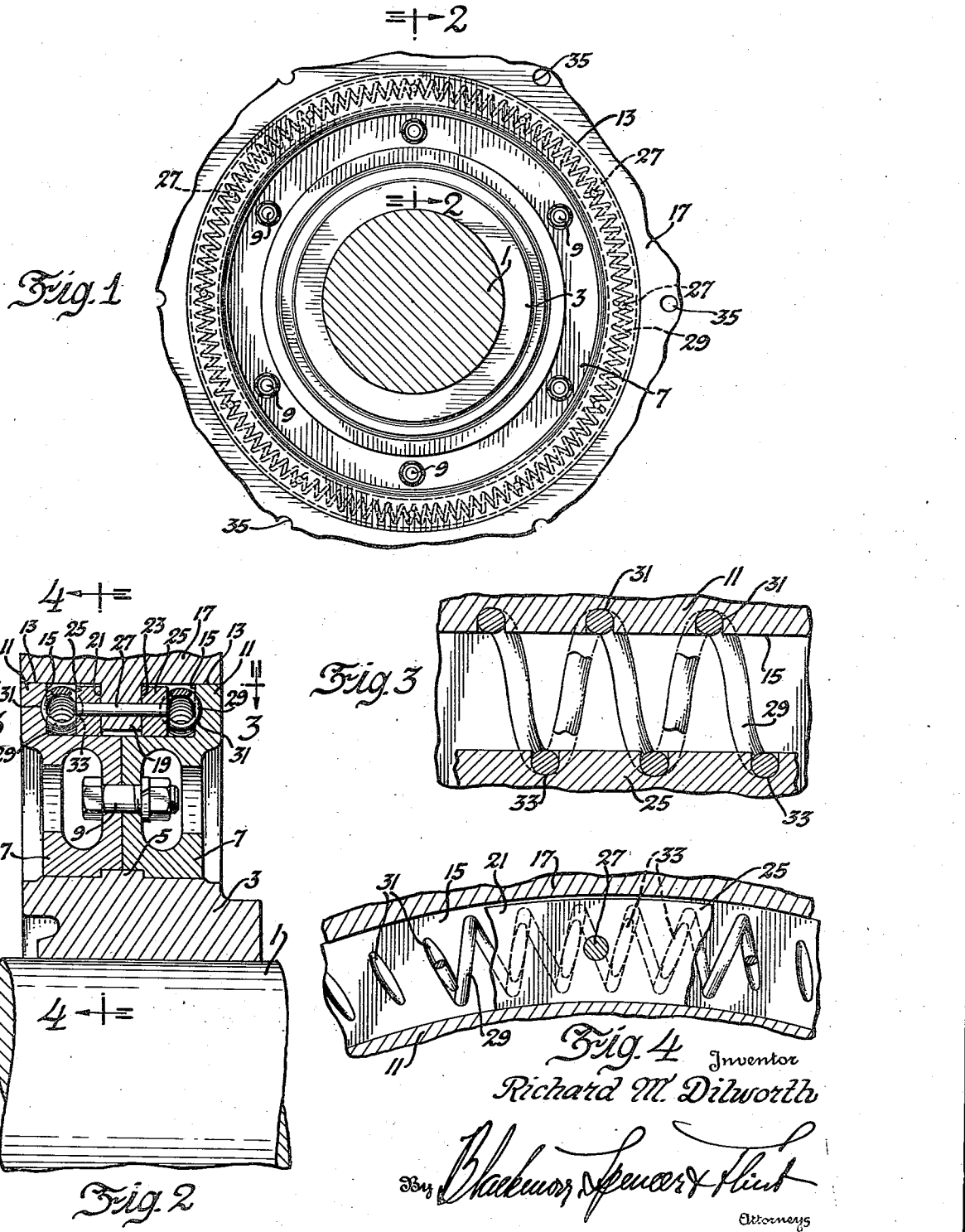

Patented Aug. 28, 1945

2,383,850

UNITED STATES PATENT OFFICE 2,383,850

FLEXIBLE COUPLING

Richard M. Dilworth, Hinsdale, Ill., assignor to General Motors Corporation, Detroit, Mich., a corporation of Delaware Application November 10, 1942, Serial No. 465,103

3 Claims. (Cl. 64—27)

The present invention relates to resilient couplings for the transmission of energy between driving and driven means.

The principal object of the present invention is to provide a resilient coupling incorporating helical springs supported between driving and driven members whereby the stress distribution in each portion of each helical spring is uniform, so that maximum cushioning capacity is obtained with minimum space requirements for the springs and the spring supporting elements comprising the coupling.

The means for accomplishing the above object is clearly explained in the following detail description taken in conjunction with the accompanying drawing in which:

Figure 1 is an end elevation of resilient coupling, of a type suitable for driving a locomotive driving wheel axle, having certain of the parts broken away to show details thereof to better advantage.

Figure 2 is an enlarged sectional view taken on line 2—2 of Figure 1.

Figure 3 is a sectional view taken on line 3—3 of Figure 2 with parts broken away and, Figure 4 is an enlarged sectional view taken on line 4—4 of Figure 2 with parts broken away to show further details of the structure.

Referring to Figures 1 and 2 the flexible coupling is shown mounted on a locomotive driving axle 1 by means of a collar 3 pressed thereon, which is provided with an outer peripheral flange portion 5. Hub or spider members 7 of annular form are pressed on the outer periphery of the collar 3 and are held in place by bolts 9 extending through aligned holes extending axially through the spider members. The inner diameter of the spiders being grooved to engage the flange portion 5 of the collar, as shown clearly in Figure 2. Each spider member is provided with an outer peripheral flange portion 11 adjacent the outer end face thereof, having an outer cylindrical surface 13 of greater diameter and an annular surface 15, the annular surfaces 15 of the two flange portions being spaced axially apart. An outer coupling member 17 or rim of annular form is loosely carried on the cylindrical surfaces 13 of the flange portions 11 of each spider, and an inner central flange portion 19 is provided on the outer member 17 shown extending inwardly between the flange portions 11 of the spiders 7. This inner central flange portion 19 is provided with annular surfaces 21 and 23 parallel to the annular surfaces 15 of the spider flange portions 11 and rings 25 of rectangular section are shown in engagement with the annular surfaces 21 and 23 of the flange portion 19 of the outer member 17 and are prevented from rotating with respect thereto by shear pins 27 pressed in axially aligned holes in the rings and flange portion 19. Torque and energy is transmitted from the annular surfaces of the rings adjacent the annular surfaces 15 of the flange portion 11 of spiders 7 by helical springs shown at 29 placed between these adjacent surfaces which are provided with grooves 31 and 33, as best shown in Figures 3 and 4 forming a portion of a helix in which each half turn of the helical springs is carried so that each half turn carries equal stress and deflects an equal amount due to the torque transmitted through both of the springs to absorb and cushion variations in the torque transmitted. The springs 29 also absorb any variation in axial force between the outer member 17 and spider members 7.

The grooves 31—33 in the spider and ring members 7 and 25 respectively may be conveniently cut by means of a helical hob and the elements comprising the flexible coupling may be assembled into a compact unit requiring little space. The holes 35 shown extending axially through the outer member provide the means for attaching any type of driving or driven member thereto. The resilient coupling shown being adapted to be inserted in place of the axle gear of a locomotive which is driven by the drive pinion of an electric traction motor, not shown, which is suspended between the axle and truck bolster, in which case gear teeth are cut directly on the periphery of the outer member 17 for engagement by the pinion teeth. The coupling disclosed is capable of cushioning the sudden and large variations in torque and axial load encountered in this type of service and requires no more space than does the conventional axle gear.

I claim:

1. A flexible coupling comprising an outer rim member having an internal flange intermediate its side faces, annular members fixed on opposite sides of said flange having grooves in their outer faces forming a part of a helix, a pair of inner hub or spider members having external flange portions adjacent the outer side faces thereof, the inner annular surfaces of said flange portions of said hub members having grooves forming a complementary part of said helix, a pair of helical springs adapted to have portions of adjacent turns thereof entered into the grooves of adjacent faces of the members fixed to the rim member and the grooves in the faces of the flange portions of the hub members, and means for holding the hub members together to keep said springs in engagement with said grooves of said members and flanges whereby the coupling assembly absorbs torque and axial forces between the rim and hub members.

2. A flexible coupling comprising a rim member having an internal flange, shear members supported by said rim member, rings supported on opposite sides of said flange by said shear members, the outer radial faces of each of said ring members being provided with grooves forming part of a helix, helical springs having portions of adjacent turns adapted to be entered in the grooves in each of said ring members, hub members adapted to be entered into the rim member, each hub member having an external flange provided with grooves in the inner radial face of said flange forming a complementary part of the helix for supporting adjacent turns of a helical spring, and means for securing said hub members in coaxial abutting relation within said rim member so that said helical springs resiliently absorb the torque and axial forces between said hub members and said rim member.

3. A flexible coupling comprising a rim member having a central internal flange, shear pins supported in said flange, ring members secured on opposite sides of said flange by said shear pins, the outer radial face of each ring member having grooves forming part of a helix, a helical spring adapted to have portions of adjacent turns entered into the grooves in each of said ring members, a pair of hub members, each of said hub members having an outer external flange supported in the outer edge portion of said rim member and grooves in the inner radial face of said flange forming part of a helix for also supporting other portions of adjacent turns of one of said springs, and means for holding said hub portions in abutting relation so that turns of the springs resiliently absorb both radial and torque forces between the hub members and ring member.

RICHARD M. DILWORTH.